United States Patent

Kniep et al.

[11] Patent Number: 5,728,316
[45] Date of Patent: Mar. 17, 1998

[54] SALT MIXTURES FOR STORING THERMAL ENERGY IN THE FORM OF THAT OF PHASE TRANSFORMATION

[75] Inventors: Rüdiger Kniep, Langenfeld; Hans Klein, Darmstadt; Peter Kroeschell, Riedstadt, all of Germany

[73] Assignees: Merck Patent Gesellschaft mit beschrankter Haftung, Darmstadt; Bayerische Motorenwerke AG, Munich, both of Germany

[21] Appl. No.: 721,580

[22] Filed: Sep. 25, 1996

Related U.S. Application Data

[63] Continuation of Ser. No. 244,785, Sep. 22, 1994, Pat. No. 5,591,374.

[30] Foreign Application Priority Data

Jan. 10, 1991 [DE] Germany .................. 42 03 835.9
Dec. 14, 1991 [DE] Germany .................. 41 41 306.7

[51] Int. Cl.⁶ .................................................. C09K 5/06
[52] U.S. Cl. .................. 252/70; 252/67; 165/104.17; 165/DIG. 4
[58] Field of Search ................... 252/70, 71, 67, 252/73; 165/104.7, DIG. 4

[56] References Cited

U.S. PATENT DOCUMENTS 4,283,298  8/1981  Lane et al. .

FOREIGN PATENT DOCUMENTS 257 001    2/1988   European Pat. Off. .
3990274    3/1990   Germany .
3929900    3/1991   Germany .
2179135    2/1987   United Kingdom .
89/09249  10/1989   WIPO .

OTHER PUBLICATIONS

Abstract of WO 8909249.
Abstract of DE 3929900.

*Primary Examiner*—Paul Lieberman
*Assistant Examiner*—Necholus Ogden

[57] ABSTRACT

The invention relates to salt mixtures composed of $Mg(NO_3)_2 \cdot 6H_2O$ and $LiNO_3$ in a mass ratio of 86–81:14–19 for storing and utilizing thermal energy in the form of heat of phase transformation. They are eminently suitable as latent heat storage media for heat reservoirs for storing and utilizing the waste heat of motor vehicle engines.

5 Claims, 1 Drawing Sheet

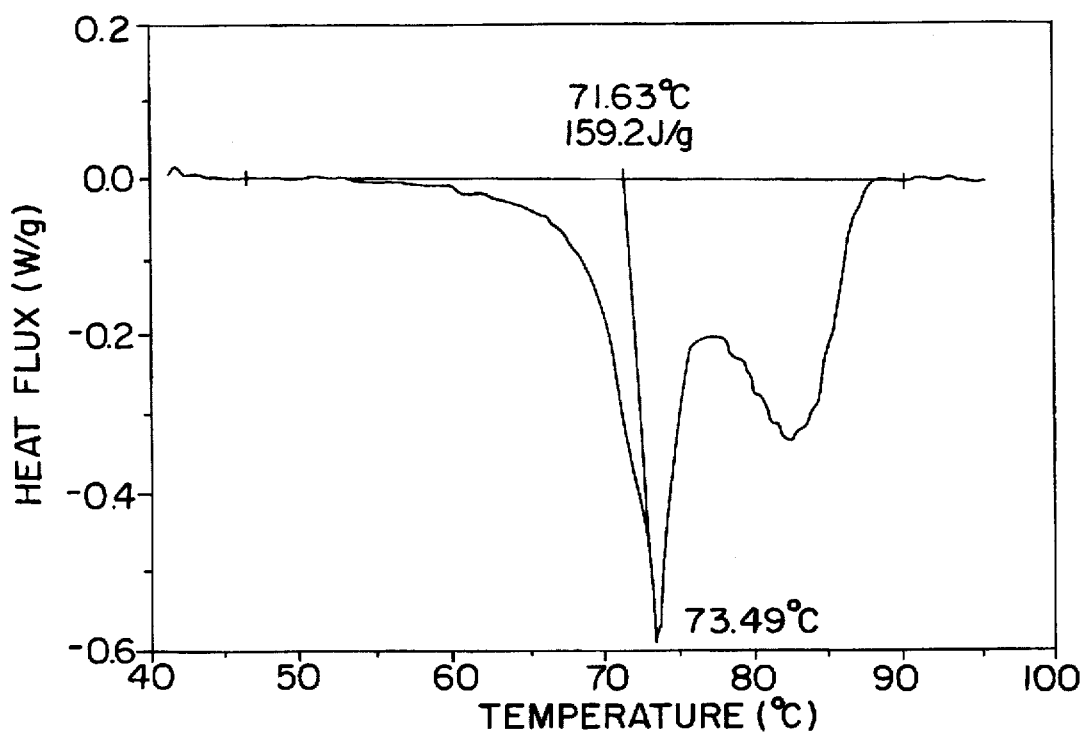
FIG. I
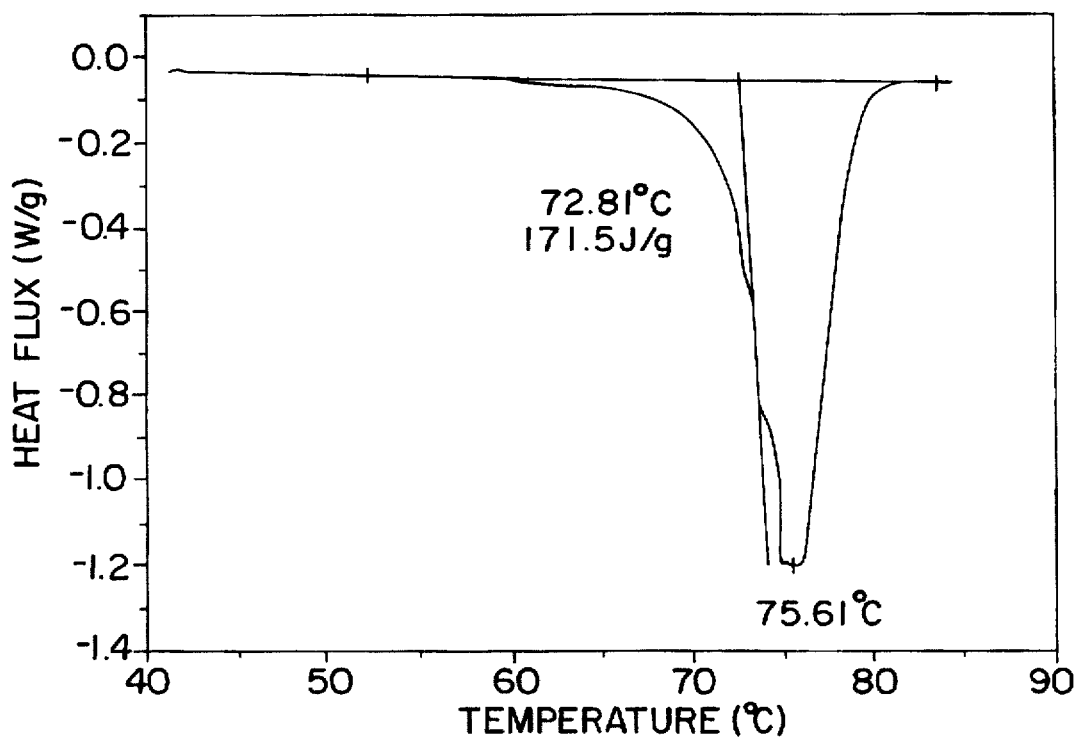
FIG. 2

SALT MIXTURES FOR STORING THERMAL ENERGY IN THE FORM OF THAT OF PHASE TRANSFORMATION

This is a continuation of the application Ser. No. 08/244,785 filed Sep. 22, 1994 U.S. Pat. No. 5,591,374.

BACKGROUND OF THE INVENTION

The invention relates to salt mixtures for storing thermal energy in the form of heat of phase—transformation. The invention further relates to the use of said salt mixtures as latent heat storage media for storing and utilizing the waste heat of motor vehicle engines and to corresponding heat reservoirs for use in motor vehicles.

Thermal energy originating from any energy system is utilizable if it can be stored and, when required, can again be retrieved from the reservoir. This type of heat supplier includes, for example, solar radiation energy, the waste heat of any machines, e.g. of motor vehicle engines, process heat, or the electrical energy often supplied at lower cost during the hours of the night, for reasons of energy management and tariffs (off-peak electricity).

Thus, in particular, it is advantageous to equip motor vehicles with a heat reservoir, for example by means of integration into the oil and or coolant circuit, in that after a prolonged standstill the cooled-down engine can be rapidly brought back up to its operating temperature by the heat stored from previous running. As a result, the warm-up period of the engine is considerably reduced. As is well known, the warm-up period of motor vehicle engines involves increased fuel consumption and less favorable exhaust gas data and increased engine wear.

It is known that, as a substance melts, i.e. during the transition from the solid to the liquid phase, heat is consumed, i.e. absorbed, which, as long as the liquid state persists, is stored in latent form, and that said latent heat is released again during solidification, i.e. during the transition from the liquid to the solid phase. It is then important to find materials whose melting temperature is in a range which corresponds to the temperature level of the supplied heat and which have a high heat of phase transformation. For the purpose of storing the engine waste heat of motor vehicles it is thus desirable, e.g., for the melting temperature of the material to be in the range of 70°–80° C., preferably at approximately 75° C. Furthermore, such materials must be stable to beyond the range of the maximum operating temperature of motor vehicles (approximately 125° C.) and must not have a corrosive effect on the motor vehicle units in question.

It is furthermore a requirement for such latent heat storage materials to remain stable over any number of melting and solidification cycles and not to exhibit any changes in the phase transformation point and the heat of transformation.

DE-A-39 29 900 proposes phase change materials which are based on mixtures of magnesium nitrate with nitrates of the alkali metals or alkaline earth metals. For storing the engine waste heat of motor vehicles in particular, mixtures of magnesium nitrate hexahydrate ($Mg(NO_3)_2.6H_2O$) and litium nitrate [sic] ($LiNO_3$) in a mass ratio of approximately 9:1 are recommended. For a mixture defined as comprising 92–87 g of $Mg(NO_3)_2.6H_2O$ and 8–13 g of $LiNO_3$ there is quoted there, for example, a melting temperature of 70°±2° C. and a heat of fusion of 54.32 Wh/kg (corresponding to 195.6 J/g).

It was found, however, that the known phase change material has a tendency to phase separation even after a few melting and solidification cycles. It is then no longer melted completely, owing to which its heat of transformation and the storage capacity are drastically reduced.

More detailed studies on these mixtures have shown, in addition, that the heat of phase transformation is only about 158 J/g and is thus not optimal. Another unfavorable factor is that the melting temperature is just at the bottom end of the desirable range.

SUMMARY OF THE INVENTION

The object of the invention is therefore to provide a salt mixture for use as a latent heat storage medium for storing heat, especially of an cooling water of motor vehicles, which medium after an unlimited number of melting and solidification cycles exhibits an unchangingly high heat of transformation and which is optimal in terms of melting temperature and heat of phase transformation.

We have found that salt mixtures of $Mg(NO_3)_2.6H_2O$ and $LiNO_3$ in a mass ratio of 86–81:14–19 and especially the eutectic mixture of these two salts in the mass ratio of 83.7:16.3 are considerably superior to the previously known mixtures. Thus, the melting temperatures of the salt mixtures having said mass ratios are distinctly above 72° C., in particular above 75° C. A higher melting temperature, which is thus closer to the operating temperature of motor vehicle engines, is particularly desirable for motor vehicle heat reservoirs. Furthermore, the salt mixtures according to the invention have a distinctly higher enthalpy of crystallization or fusion than corresponding salt mixtures having different mass ratios. In practice this means that, for example, for a given amount of salt containing the salt mixtures according to the invention a greater amount of heat is absorbed at the phase transformation point or is made available again. Conversely, for a given quantity of heat demanded a smaller amount of salt mixture is required, so that appropriate heat reservoirs can be made smaller and lighter.

Particular advantages are provided by the eutectic mixture of $Mg(NO_3)_2.6H_2O$ and $LiNO_3$. In this mixture, the components are present in a mass ratio of 83.7:16.3. This mixture, with a melting temperature of 75.6° C. and a heat of phase transformation of 171.5 J/g, exhibits optimal properties.

FIG. 1 shows the DSC (Differential Scanning Calorimetry) diagram of a salt mixture composed of $Mg(NO_3)_2.6H_2O$ and $LiNO_3$ in a weight ratio of 9:1 corresponding to DE-A-39 29 900 and FIG. 2 shows the DSC diagram of a salt mixture according to the invention composed of 83.7 parts by weight of $Mg(NO_3)_2.6H_2O$ and 16.3 parts by weight of $LiNO_3$. It can be seen that according to FIG. 1 two maxima occur in a broad melting range of from approximately 70° C. to 88° C., whereas according to FIG. 2 only a single sharp maximum in the range of from approximately 71° to 78° C. occurs with a center at 75.6° C. The heat of fusion, which was calculated by integration of the maxima, was 159.2 J/g in the material according to DE-A-39 29 900, and 171.5 J/g in the salt mixture according to the invention.

It is particularly surprising to find that the salt mixtures according to the invention are extremely stable and show virtually no changes, over an unlimited number of melting and solidification cycles, in the phase transformation point and the heat of transformation.

In this context it was found to be important that the preparation of the latent heat storage material according to the invention is carried out by the mixture of magnesium nitrate hexahydrate and lithium nitrate being fused in a sealed vessel having a small free volume. That means that after fusion of the mixture more than 70% of the vessel should be filled with the melt. This is because too large a free volume of the sealed vessel results in slight dehydration of the mixture, for example by water droplets condensing on the free surface of the inner wall of the vessel, as a result of which significant changes occur in the heat of transformation of the salt mixture. So as not to encounter significant drops in the amounts of heat exchanged even after relatively large numbers of cycles, the latent heat storage medium according to the invention should therefore be employed in completely sealed systems.

In order to obtain the latent heat storage medium according to the invention with a heat of fusion of at least 170 J/g which remains as high as ever even after any number of melting and solidification cycles, it was further found to be essential for the magnesium nitrate hexahydrate used to form the mixture to have a heat of fusion of preferably from 110 J/g to 135 J/g and more. It was found, namely, that the commercially available magnesium nitrate hexahydrate, in terms of its heat of fusion shows considerable fluctuations from batch to batch, which have a corresponding effect on the enthalpy of fusion of the salt mixture.

The cause of these fluctuations has not yet been amenable to definitive clarification. The cause is fluctuations, due to origin and preparation, in the content of water of crystallization. In all cases, the specified range of the heat of fusion is a reliable indicator for suitability of the material.

It was further possible to ascertain that—and this too is surprising—$Mg(NO_3)_2.6H_2O$ is dimorphous, the transformation temperature between the two crystal modifications being approximately 72° C. and the heat of transformation being around 12 J/g. In the latent heat storage material according to the invention, said heat of transformation between the two crystal modifications of the magnesium nitrate hexahydrate is obviously integrated into the total heat of transformation.

As X-ray crystallographic studies have shown, the lattice constants of $Mg(NO_3)_2.6H_2O$ in a mixture, obtained by fusion, of $Mg(NO_3)_2.6H_2O$ and $LiNO_3$ are significantly reduced. This is probably due to a partial formation of mixed crystals in the sense of $Mg_xLi_{2-2x}(NO_3)_2.6H_2O$ and at the same time explains the observation that in the mixture after fusion, free $LiNO_3$ can be identified only in a very small amount with the aid of X-ray powder diffraction patterns.

In the salt mixtures according to the invention, in which the magnesium nitrate hexahydrate is present with respect to the lithium nitrate in a mass ratio of from 86:14 to 81:19, especially of 83.7:16.3 (corresponding to a ratio of from approximately 3.5 to approximately 45 mol % $LiNO_3$ to from approximately 55 to approximately 65 mol % $Mg(NO_3)_2.6H_2O$, in particular of approximately 40 mol % $LiNO_3$ to approximately 60 mol % $Mg(NO_3)_2.6H_2O$), the mixed crystals composed of $Mg_xLi_{2-2x}(NO_3)_2.6H_2O$ virtually represent the main component. Apart from the X-ray crystallographic data, said mixed crystals are characterized by a radiate/acicular habit. The formation of these mixed crystals was not previously known. The invention is therefore also based on this novel effect.

The salt mixtures according to the invention are thus particularly suitable as latent heat storage media for storing and utilizing the waste heat of motor vehicle engines and thus for use in corresponding latent heat reservoirs for use in motor vehicles.

EXAMPLE

In order to prepare the mixture, the components $Mg(NO_3)_2.6H_2O$ and $LiNO_3$ in a mass ratio of 83.7:16.3 are heated in a hermetically sealed vessel in a water bath at a temperature of approximately 90° C. until a clear melt has formed. The free volume in the reaction vessel after fusion was approximately 15%. After a homogeneous, clear melt is obtained, the system is cooled or quenched to room temperature. The crystal growth of the main component of the mixture $Mg_xLi_{2-2x}(NO_3)_2.6H_2O$ is characterized by a radiate/acicular habit.

We claim:

1. A salt mixture of magnesium nitrate and lithium nitrate for storing and utilizing thermal energy in the form of heat of phase transformation, comprising a mixture of $Mg(NO_3)_2.6H_2O$ and $LiNO_3$ in a mass ratio of 86–81:14–19.

2. A process for preparing a salt mixture according to claim 1, comprising fusing a mixture of magnesium nitrate hexahydrate and lithium nitrate in a sealed vessel, wherein the filling ratio of the vessel is more than 70%.

3. A process according to claim 2, wherein the magnesium nitrate hexahydrate used to form the mixture has a heat of fusion of from 100 J/g to 135 J/g.

4. A latent heat storage media, comprising a heat reservoir storing and utilizing the waste heat of a motor vehicle engine, containing a salt mixture according to claim 1.

5. In a process for the storage of heat, comprising transferring heat to a latent storage media, the improvement wherein the storage media is one according to claim 4.

* * * * *